US010764780B2

United States Patent
Cheng et al.

(10) Patent No.: US 10,764,780 B2
(45) Date of Patent: Sep. 1, 2020

(54) METHOD OF SERVICE LEVEL TRAFFIC DIFFERENTIATION AT RADIO ACCESS NETWORK, WIRELESS NETWORK SYSTEM AND RADIO ACCESS NETWORK ACCESS NODE

(71) Applicant: INDUSTRIAL TECHNOLOGY RESEARCH INSTITUTE, Hsinchu (TW)

(72) Inventors: Ching-Wen Cheng, Tainan (TW); Hung-Chen Chen, Hsinchu (TW); Fang-Ching Ren, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 121 days.

(21) Appl. No.: 15/643,761

(22) Filed: Jul. 7, 2017

(65) Prior Publication Data

US 2018/0014223 A1  Jan. 11, 2018

Related U.S. Application Data

(60) Provisional application No. 62/359,233, filed on Jul. 7, 2016.

(51) Int. Cl.
*H04W 28/02* (2009.01)
*H04L 12/851* (2013.01)
(Continued)

(52) U.S. Cl.
CPC ......... *H04W 28/0268* (2013.01); *H04L 45/74* (2013.01); *H04L 47/2425* (2013.01);
(Continued)

(58) Field of Classification Search
CPC .......... H04W 28/0268; H04W 767/10; H04W 28/0257; H04W 28/10; H04L 45/74; H04L 47/2425; H04L 47/35; H04L 69/22
See application file for complete search history.

(56) References Cited

U.S. PATENT DOCUMENTS 7,693,613 B2  4/2010  Bitar et al.
9,007,937 B2  4/2015  Ko
(Continued)

FOREIGN PATENT DOCUMENTS

| CN | 102160424 A | 8/2011 |
|---|---|---|
| TW | I387361 B | 2/2013 |
| TW | I566624 B | 1/2017 |

OTHER PUBLICATIONS

3rd Generation Partnership Project; Technical Specification Group Services and System Aspects; Study on System Enhancements for User Plan Congestion management (Release 13); 3GPP TR 23,705 V13.0.0, Technical Report (Dec. 2014), 61 pages.

*Primary Examiner* — Kevin C. Harper
*Assistant Examiner* — Derrick V Rose
(74) *Attorney, Agent, or Firm* — Muncy, Geissler, Olds & Lowe, P.C.

(57) ABSTRACT

A method of service level differentiation at a radio access network, a wireless network system and a radio access network (RAN) access node are provided. The method of service level traffic differentiation at the radio access network includes the following steps: A core network transmits a data flow information including a flow ID to a RAN access node via a user plane packet of an interface between the core network and the RAN access node. The RAN access node sets up a data connection with a user equipment according to the data flow information.

40 Claims, 12 Drawing Sheets

(51) Int. Cl.
*H04W 28/10* (2009.01)
*H04L 12/801* (2013.01)
*H04L 29/06* (2006.01)
*H04W 76/10* (2018.01)
*H04L 12/741* (2013.01)

(52) U.S. Cl.
CPC .............. *H04L 47/35* (2013.01); *H04L 69/22* (2013.01); *H04W 28/0257* (2013.01); *H04W 28/10* (2013.01); *H04W 76/10* (2018.02)

(56) References Cited

U.S. PATENT DOCUMENTS

| | | |
|---|---|---|
| 9,179,391 B2 | 11/2015 | Zhou et al. |
| 9,271,216 B2 | 2/2016 | Friman et al. |
| 2005/0232263 A1* | 10/2005 | Sagara .................... H04L 45/02 370/389 |
| 2008/0049621 A1 | 2/2008 | McGuire et al. |
| 2009/0041088 A1 | 2/2009 | Yang et al. |
| 2009/0274092 A1 | 11/2009 | Chen et al. |
| 2011/0096934 A1 | 4/2011 | Babarskas et al. |
| 2011/0110263 A1* | 5/2011 | Yi ........................ H04L 1/1642 370/252 |
| 2012/0224677 A1 | 9/2012 | Riley et al. |
| 2013/0223336 A1 | 8/2013 | Lindner |
| 2014/0334418 A1 | 11/2014 | Urie et al. |
| 2015/0009826 A1* | 1/2015 | Ma .................... H04W 28/0268 370/235 |
| 2015/0049670 A1 | 2/2015 | Schmid et al. |
| 2015/0195326 A1 | 7/2015 | Suryavanshi et al. |
| 2015/0256629 A1 | 9/2015 | Shaheen et al. |
| 2016/0112896 A1* | 4/2016 | Karampatsis ..... H04W 28/0252 370/230.1 |
| 2016/0337905 A1 | 11/2016 | Zhang et al. |
| 2016/0360439 A1* | 12/2016 | Phan ..................... H04W 28/10 |

* cited by examiner

US 10,764,780 B2

METHOD OF SERVICE LEVEL TRAFFIC DIFFERENTIATION AT RADIO ACCESS NETWORK, WIRELESS NETWORK SYSTEM AND RADIO ACCESS NETWORK ACCESS NODE

This application claims the benefit of Unite State provisional application Ser. No. 62/359,233, filed Jun. 7, 2016, the disclosure of which is incorporated by reference herein in its entirety.

TECHNICAL FIELD

The disclosure relates in general to a method of service level traffic differentiation at a radio access network, a wireless network system and a radio access network access node (RAN access node).

BACKGROUND

A variety of wireless communication products are developed along with the evolution of wireless communication technology. One of the invention of the wireless communication technology is to support faster transmission rate and better transmission quality. The long term evolution (LTE) technology has been extensively used in various communication products. The development of the next generation wireless communication system, that is, the 5th generation wireless system, has been started and in progress.

Quality of service (QoS) is important to the communication technology. QoS control is a mechanism to prioritize user equipment or data flows or to perform different data flow treatments to achieve the required performance according to the requirements of applications. Network resource management is one of the critical technology to achieve the required QoS, especially for delay sensitivity data flows of the applications such as multimedia streaming or disaster prevention and reaction.

A service data flow (SDF) of the Evolved Packet System (EPS) is transmitted between a user equipment (UE) and a peer entity via a radio access network access node (RAN access node), and the QoS features of the bearer between the peer entity and the core network, between the core network and the RAN access node, and between the RAN access node and the UE possess a one-to-one correspondence relationship. In the 5th generation wireless communication system, a service data flow (SDF) is transmitted to the RAN access node via a QoS flow, and is further transmitted to the user equipment by the RAN access node via a data radio bearer. However, the QoS flow and the data radio bearer is not limited to a one-to-one corresponding relationship. The RAN access node could transmit the data flows of multiple QoS flows having different QoS features via the same data radio bearer that imposes the same QoS features in the radio access network to the QoS flows or could establishment a new data radio bearer for a QoS flow with the QoS feature required by the QoS flow. Therefore, the RAN access node needs the QoS features of the QoS flows as well as the features of the data flows of the QoS flows e.g., to differentiate the treatment such as scheduling of the user plane packets of the data flows to achieve the QoS requirement of the QoS flows and the data flows, such that the QoS of the SDF transmitted between the peer entity and the user equipment can be maintained. Here below, the data flow features corresponding to the user plane packets are referred as "service type", and the differentiation of service types is referred as "service level traffic differentiation".

SUMMARY

The disclosure is directed to a method of service level traffic differentiation at a radio access network, a wireless network system and a radio access network access node (RAN access node).

According to one embodiment of the present disclosure, a method of service level traffic differentiation at a radio access network of a wireless network system is provided. The method of service level traffic differentiation at the radio access network includes the following steps. A core network transmits a data flow information including a flow ID to a RAN access node via a user plane packet of an interface between the core network and the RAN access node. The RAN access node sets up a data connection with a user equipment according to the data flow information.

According to another embodiment of the present disclosure, a wireless network system including a core network, a RAN access node and a user equipment is provided. The core network transmits a data flow information including a flow ID via a user plane packet of an interface between the core network and the RAN access node. The RAN access node receives the data flow information. The RAN access node sets up a data connection with a user equipment according to the data flow information.

According to an alternate embodiment of the present disclosure, a RAN access node is provided. The RAN access node includes a receiving unit, a processing unit and a transmission unit. The receiving unit receives a data flow information including a flow ID from a core network of a wireless network system via a user plane packet of an interface between the core network and the RAN access node. The processing unit determines a bearer corresponding with the user plane packet according to the data flow information and the user equipment associated the data flow information. The transmission unit sets up a data connection with the user equipment according to the bearer.

The above and other aspects of the invention will become better understood with regard to the following detailed description of the preferred but non-limiting embodiment(s). The following description is made with reference to the accompanying drawings.

DETAILED DESCRIPTION

Figure 1:
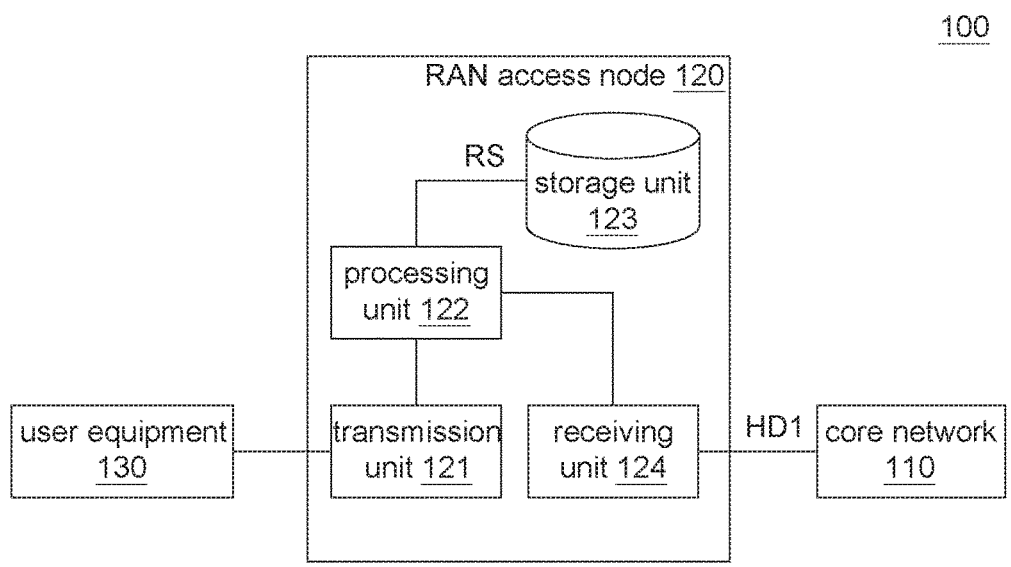
FIG. 1 is a schematic diagram of a wireless network system according to an embodiment of the present disclosure.

Referring to FIG. 1, a schematic diagram of a wireless network system 100 according to an embodiment of the present disclosure is shown. Exemplarily but not restrictively, the wireless network system 100 can be realized by a 5th generation wireless system. The wireless network system 100 includes a core network 110, a radio access network access node (RAN access node) 120 and a user equipment 130. The RAN access node 120 can be realized by an evolved node B (eNB) or a next generation node B (gNB). The RAN access node 120 includes a receiving unit 124, a transmission unit 121, a processing unit 122 and a storage unit 123.

In the present embodiment, during data flow process, a data flow information DF is transmitted between the core network 110 and the RAN access node 120 via a user plane packet header HD1 of a user plane packet of the interface between the core network and the RAN access node (FIG. 2A), such that the RAN access node 120 can perform service level traffic differentiation, and set up a data connection with the user equipment 130. In another embodiment, partial content (such as the service type ID) rather than the total content of the data flow information DF is transmitted between the core network 110 and the RAN access node 120 via the content of a user plane packet.

Figure 2A:
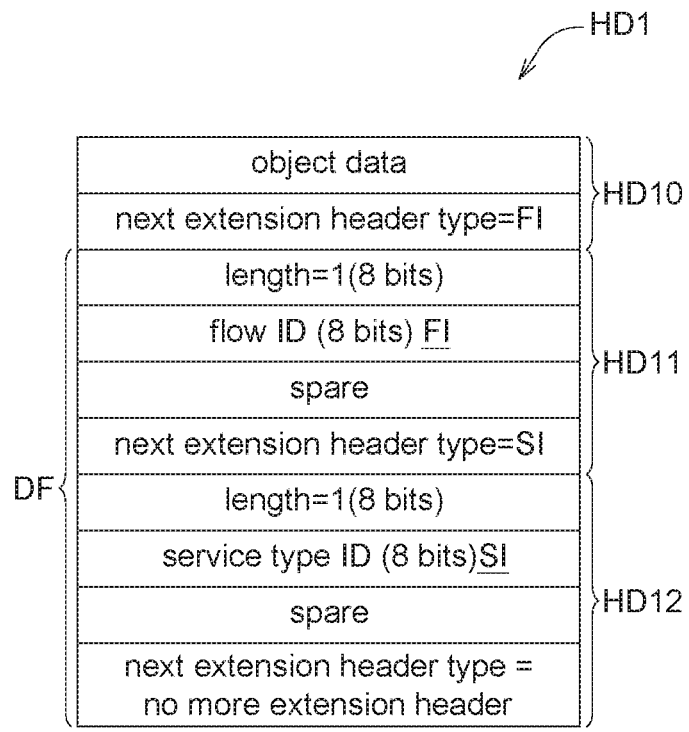
FIG. 2A is a schematic diagram of a user plane packet header of the interface between the core network and the RAN access node according to an embodiment.

Referring to FIG. 2A, a schematic diagram of a user plane packet header HD1 according to an embodiment is shown. Let the General Packet Radio Service (GPRS) Tunneling Protocol for the user plane (GTP-U) be taken for example. The normal header HD10 of the user plane packet header HD1 records the original object data (such as protocol type (PT), message type, and sequence number) and the next extension header type. The extension headers HD11 and HD12 of the user plane packet header HD1 respectively record a flow ID FI of the data flow information DF and a service type ID SI of the data flow information DF.

Figure 3:
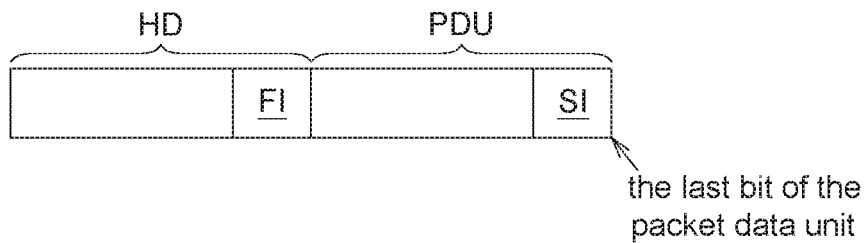
FIG. 3 is a schematic diagram of a user plane packet of the interface between the core network and the RAN access node according to another embodiment.

Referring to FIG. 3, a schematic diagram of a user plane packet of the interface between the core network and the RAN access node according to another embodiment is shown. The user plane packet header HD records the flow ID FI of the data flow information DF, and the packet data unit PDU of the user plane packet records the service type ID SI of the data flow information DF.

Figure 4:
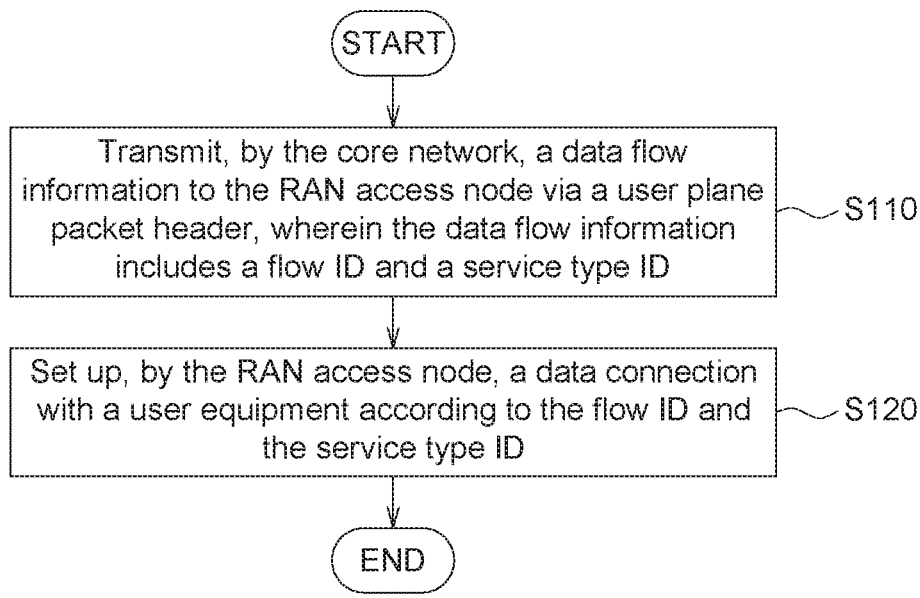
FIG. 4 is a flowchart of a method of service level traffic differentiation in a wireless network system according to an embodiment of the present disclosure.

Referring to FIG. 4, a flowchart of a method of service level traffic differentiation in a wireless network system according to an embodiment of the present disclosure is shown. In step S110, the core network 110 transmits the data flow information DF to the RAN access node 120 via the user plane packet header HD1, wherein the data flow information DF includes the flow ID FI and the service type ID SI. In another embodiment, in step S110, the core network 110 transmits partial content of the data flow information DF to the RAN access node 120 via the user plane packet header and transmits the remaining content of the data flow information DF to the RAN access node 120 via the content of the user plane packet.

In an embodiment, the flow ID FI includes a configuration of quality of services (configuration of QoS), such as packet delay budget, packet error rate, transmission priority of the data flow of the packet, and guaranteed or non-guaranteed bit rate. The service type ID SI includes a service data flow feature (SDF feature), such as a throughput emphasis, a reliability emphasis, a delay sensitivity, or a network slice instance ID. The flow ID FI and the service type ID SI can be formulated by an operator of the wireless network system or according to standard specifications.

In step S120, the RAN access node 120 sets up a data connection with a user equipment 130 according to the flow ID FI and the service type ID SI.

With the flow ID FI and the service type ID SI, the RAN access node 120 can perform service level traffic differentiation and accordingly determine the QoS of the corresponding bearer to set up the data connection with the user equipment 130.

As indicated in FIG. 2A, the flow ID FI and the service type ID SI are discontinuously recorded in the user plane packet header HD1 (such as the extension header HD11 and the extension header HD12). The last block of the normal header HD10 (such as the last byte) records the next extension header type as the flow ID FI, the last block of the extension header HD11 records the next extension header type as the service type ID SI, and the last block of the extension header HD12 records the next extension header type as no more extension header such as a null value. Through the record of the next extension header type, the positions of the flow ID FI and the service type ID SI can be obtained.

In the present embodiment, the user plane packet header HD1 is byte alignment. In the present embodiment, the length of the user plane packet header HD1 is a multiple of 8 bits. In an embodiment indicated in FIG. 2A, the length of the flow ID FI is fixed as 8 bits, and the length of the service type ID SI is fixed as 8 bits, such that the overall length of the user plane packet header HD1 can be byte alignment.

Figure 2B:
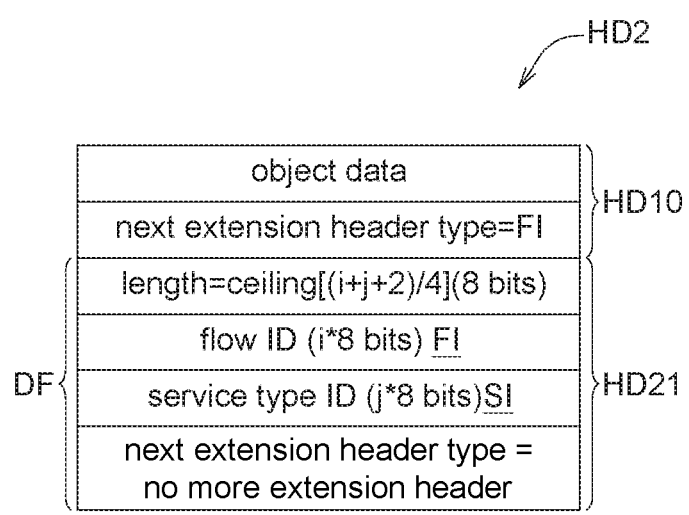
FIG. 2B is a schematic diagram of a user plane packet header of the interface between the core network and the RAN access node according to another embodiment.

Referring to FIG. 2B, a schematic diagram of a user plane packet header HD2 according to another embodiment is shown. In another embodiment, the flow ID FI and the service type ID SI are continuously recorded in the user plane packet header HD2 (such as the extension header HD21), the sum of the lengths of the flow ID FI and the service type ID SI which appear successively is byte alignment, and a byte information element is used for indicating the number of bytes of the total length. In an embodiment, the length of the flow ID FI can be fixed as i*8 bits, and the length of the service type ID SI can be fixed as j*8 bits, wherein i and j are positive integers. In another embodiment, the length of the flow ID FI can be fixed as i bits, and the length of the service type ID SI can be fixed as j bits, wherein i and j are positive integers. The lengths and the order of appearance of the flow ID FI and the service type ID SI are formulated according to standard specifications.

In another embodiment, the length of the flow ID FI or the length of the service type ID SI can be variable, and the starting position of the service type ID SI is indicated by a service type ID indicator i_SI with a fixed length. The sum of the lengths of the flow ID FI and the service type ID SI is fixed, the lengths and the order of appearance of the flow ID FI and the service type ID SI are formulated according to standard specifications, and the length of the identification data which appears first is denoted by an identification parameter of the user plane packet header, and the overall length of the user plane packet header is byte alignment. In another embodiment, the length of the flow ID FI or the length of the service type ID SI can be variable, and the starting position of the service type ID SI is indicated by a service type ID indicator i_SI with a fixed length. The sum of the length of the flow ID FI and the length of the service type ID SI are fixed, the lengths and the order of appearance of the flow ID FI and the service type ID SI are formulated according to standard specifications, the starting position of the identification data which appears later is denoted by an identification parameter of the user plane packet header, and the overall length of the user plane packet header is byte alignment. In another embodiment, the length of the flow ID FI or the length of the service type ID SI can be variable, and the starting position of the service type ID SI is indicated by a service type ID indicator i_SI with a fixed length. The lengths and the order of appearance of the flow ID FI and the service type ID SI are formulated according to standard specifications, the starting position of the identification data is denoted by an identification parameter of the user plane packet header, the sum of the length of the flow ID FI and the length of the service type ID SI is denoted by another identification parameter of the user plane packet header, and the overall length of the user plane packet header is byte alignment.

Referring to FIG. 3, a schematic diagram of a user plane packet according to another embodiment. In another embodiment, the flow ID FI is recorded in the user plane packet header HD of the user plane packet, the service type ID SI is recorded in the packet data unit PDU of the user plane packet. The service type ID SI is recorded at the end of the packet data unit PDU. The length of the service type ID SI is a configured number of bits or bytes. The last bit of the service type ID SI is the last bit of the packet data unit. The service type ID SI is not encrypted by an encryption key used for the user plane encryption protection between the user equipment 130 and the core network 110. The configured number of bits or bytes of the length of the service type ID SI can be formulated in the standard communication documents or can be informed in advance by the core network element and configured in the RAN access node.

Figure 5:
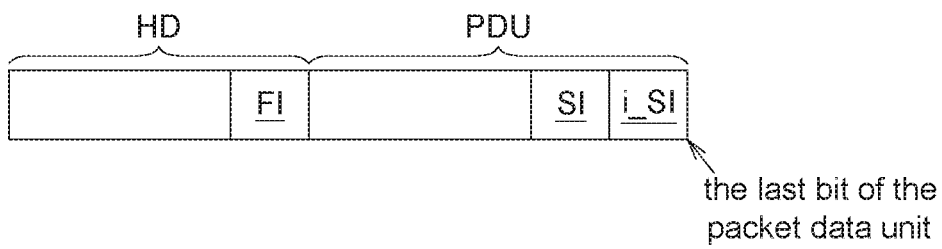
FIG. 5 is a schematic diagram of a user plane packet of the interface between the core network and the RAN access node according to another embodiment.

Referring to FIG. 5, a schematic diagram of a user plane packet according to another embodiment is shown. In another embodiment, the flow ID FI is recorded in the user plane packet header HD of the user plane packet, the service type ID SI is recorded in the packet data unit PDU of the user plane packet, and the starting position of the service type ID SI is indicated by a service type ID indicator i_SI with a fixed length. wherein the service type ID indicator i_SI is recorded at the end of the packet data unit PDU, the length of the service type ID indicator i_SI is a configured number of bits or bytes, the last bit of the service type ID indicator i_SI is the last bit of the packet data unit PDU, and both the service type ID indicator i_SI and the service type ID SI are not encrypted by an encryption key used for the user plane encryption protection between the user equipment 130 and the core network 110. The length of the service type ID indicator i_SI can be formulated in the standard communication documents or can be configured from the core network to the RAN access node.

Figure 2C:
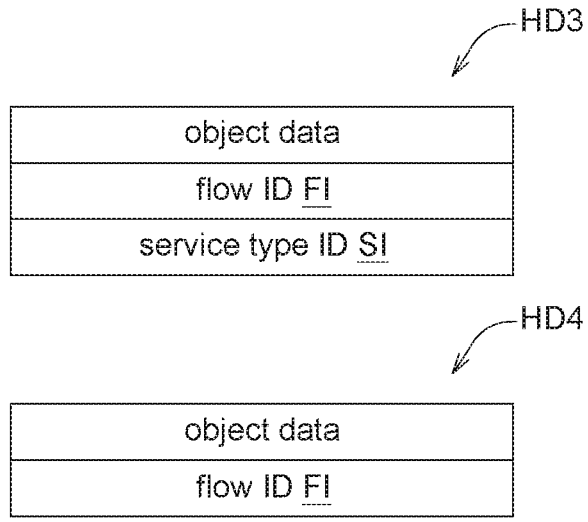
FIG. 2C is a schematic diagram of a user plane packet header of the interface between the core network and the RAN access node according to another embodiment.

Refer to FIG. 1 and FIG. 2C. FIG. 2C is a schematic diagram of user plane packet header HD3 and HD4 according to another embodiment. In another embodiment, the RAN access node 120 receives a user plane packet comprises a flow ID FI and a service type ID SI, wherein the user plane packet is the first user plane packet of a data flow associated with the flow ID FI. After reading the user plane packet header HD3, the RAN access node 120 maintains a correspondence relationship RS between the flow ID FI and the service type ID SI to the storage unit 123. The RAN access node 120 identifies the correspondence relationship RS between the flow ID FI and the service type ID SI according to an instruction from the core network 110, and accordingly sets up, maintains, modifies or deletes the correspondence relationship RS.

In another embodiment, the RAN access node 120 receives a user plane packet comprises a flow ID FI and a service type ID SI, wherein the user plane packet is the first user plane packet of the data flow associated with the flow ID FI, the flow ID FI is recorded in the user plane packet header HD, and the service type ID SI is recorded in the packet data unit PDU of the user plane packet. The RAN access node 120 reads the user plane packet header HD to obtain the flow ID FI, reads the packet data unit PDU of the user plane packet to obtain the service type ID SI, and maintains the correspondence relationship RS between the flow ID FI and the service type ID SI to the storage unit 123. The RAN access node 120 identifies the correspondence relationship RS between the flow ID FI and the service type ID SI according to the instruction from the core network 110.

In another embodiment, the RAN access node 120 receives a user plane packet comprises a flow ID FI, a service type ID SI, and a service type ID indicator i_SI, wherein the user plane packet is the first user plane packet of a data flow associated with the flow ID FI, the flow ID FI is recorded in the user plane packet header HD, and the service type ID SI and the service type ID indicator i_SI are recorded in the packet data unit PDU of the user plane packet. The RAN access node 120 reads the user plane packet header HD to obtain the flow ID FI, reads the packet data unit PDU of the user plane packet to obtain the service type ID indicator i_SI, obtains the starting position of a service type ID SI according to the service type ID indicator i_SI, and obtains the service type ID SI according to the starting position of the service type ID SI. The service type ID indicator i_SI indicates the number of bits or bytes as the length of the service type ID SI or the starting position of the service type ID SI. The RAN access node 120 maintains the correspondence relationship RS between the flow ID FI and the service type ID SI to the storage unit 123. The RAN access node 120 identifies the correspondence relationship RS between the flow ID FI and the service type ID SI according to the instruction from the core network 110.

Figure 6:
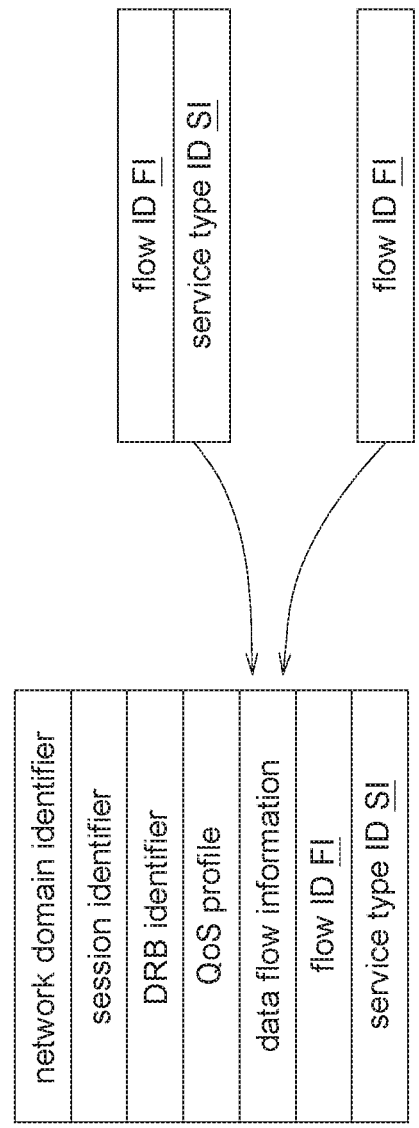
FIG. 6 is a schematic diagram of a correspondence relationship maintained in a RAN access node.

Referring to FIG. 6, a schematic diagram of a correspondence relationship RS maintained in a RAN access node 120 is shown. The correspondence relationship RS at least includes a first correspondence relationship, a second correspondence relationship and a third correspondence relationship. The first correspondence relation is a peer entity identification (such as a network domain ID) which is used for identifying the entity with which and a user equipment a service data flow (SDF) is set up to transmit a user plane packet. The first correspondence relationship includes the correspondence relation of a session identifier, a data radio bearer (DRB) identifier for transmitting the user plane packet, and at least one second corresponding relationship associated with a QoS profile identifier. The second corresponding relationship includes the correspondence relationship of a QoS profile identifier and at least a third correspondence relationship. The third correspondence relationship includes the correspondence relationship of a flow ID FI and a service type ID SI.

When the correspondence relationship RS of the flow ID FI and a service type ID SI has been maintained in the storage unit 123, the service type ID SI cold be absent from the second and later user plane packets received from the core network 110, the RAN access node 120 could inquire the correspondence relationship RS of the storage unit 123 according to the flow ID FI of the user plane packet header HD4 to obtain the service type ID SI corresponding to the user plane packet.

Figure 2D:
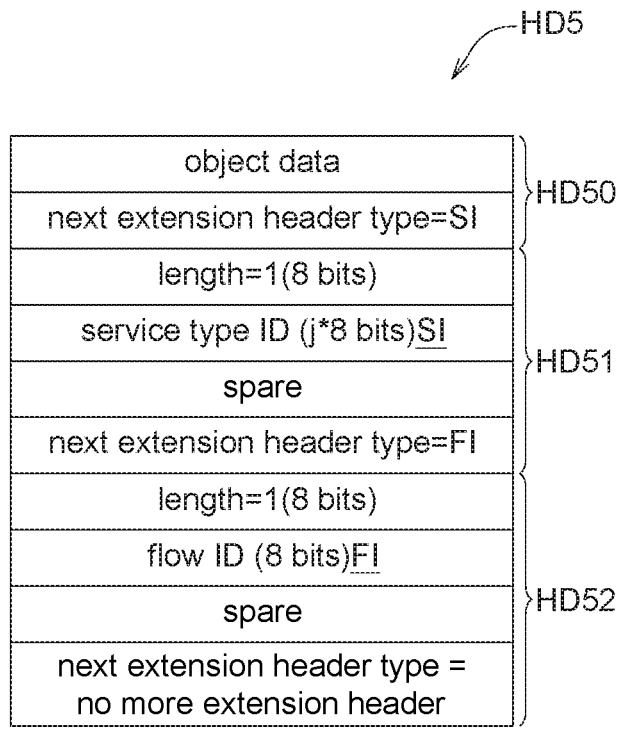
FIG. 2D is a schematic diagram of a user plane packet header of the interface between the core network and the RAN access node according to another embodiment.

Referring to FIG. 2D, a schematic diagram of a user plane packet header HD5 according to another embodiment is shown. In another embodiment, the service type ID SI is recorded prior to the flow ID FI. The service type ID SI is recorded in the extension header HD51, and the flow ID FI is recorded in the extension header HD52. The last block of the normal header HD50 records the next extension header type as the service type ID SI, the last block of the extension header HD51 records the next extension header type as the flow ID FI, the last block of the extension header HD52 records the next extension header type as no more extension header such as a null value. Based on the record of the next extension header type, the recording positions of the flow ID FI and the service type ID SI can be obtained accordingly.

In an embodiment indicated in FIG. 2D, the length of the service type ID SI can be fixed as j*8 bits, and the length of the flow ID FI can be fixed as 8 bits.

Figure 7:
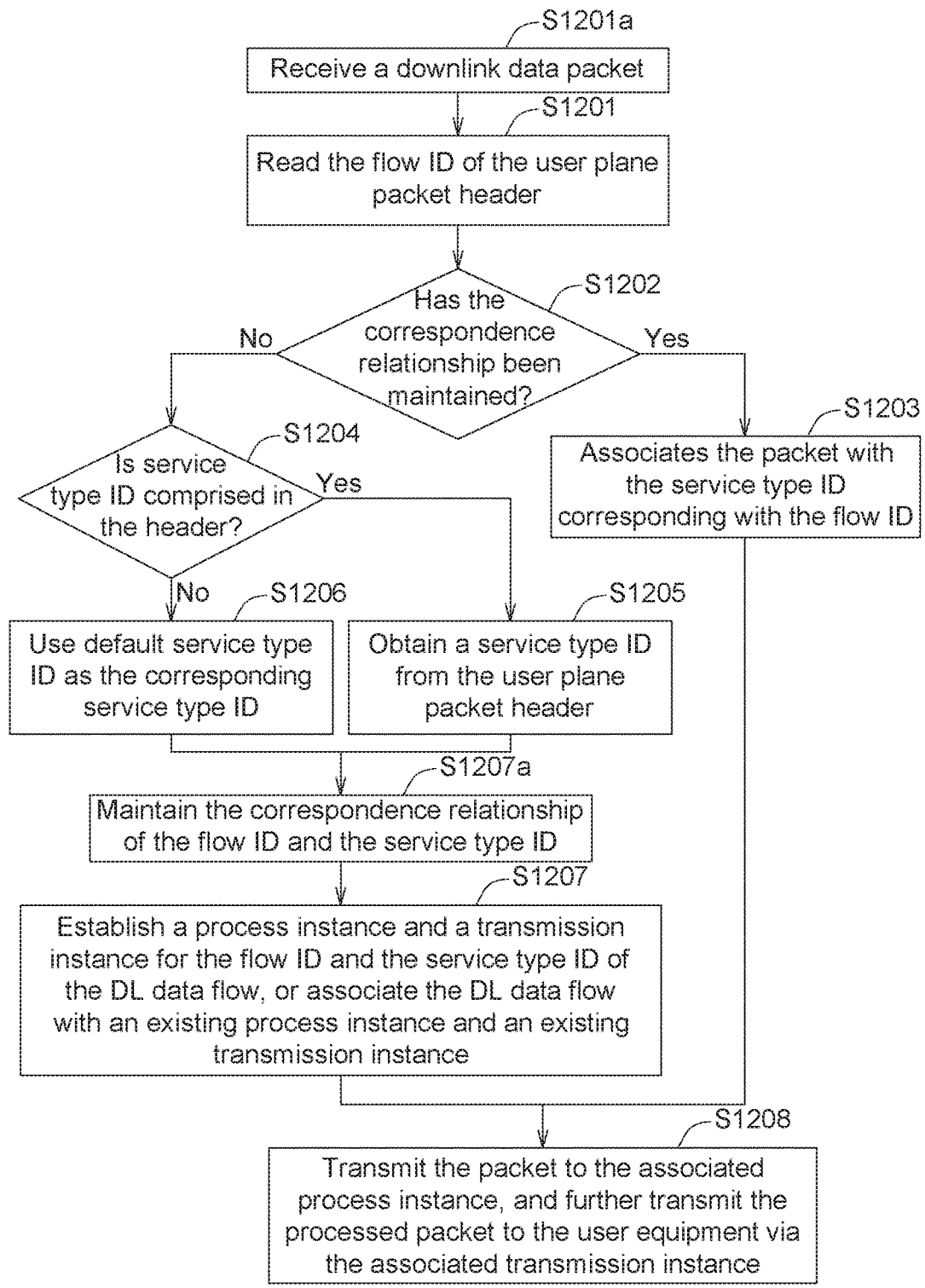
FIG. 7 is a detailed flowchart of step S120 of FIG. 4 according to an embodiment.

Referring to FIG. 7, a detailed flowchart of step S120 of FIG. 4 according to an embodiment is shown. The flowchart is described below with referring to the user plane packet headers HD3 and HD4 of FIG. 2C. Firstly, the receiving unit 124 of a RAN access node 120 receives a user plane packet, such as a downlink data packet, from the core network 110 (step S1201a). The receiving unit 124 transmits the user plane packet to the processing unit 122 which further reads and identifies the flow ID FI of the user plane packet headers HD3 or HD4 (step S1201). The processing unit 122 obtains the arrangement of the information elements of the user plane packet headers HD3 or HD4 according to the next extension header type.

If the RAN access node 120 has already maintained the correspondence relationship RS of the flow ID FI and a service type ID SI, the RAN access node 120 obtains the service type ID SI corresponding to the flow ID according to the correspondence relationship RS (steps S1202 and S1203).

After the processing unit 122 of the RAN access node 120 reads and identifies the flow ID FI of the user plane packet, if the RAN access node 120 has not yet maintained the correspondence relationship of the flow ID FI and the service type ID SI, then the RAN access node 120 sets up and maintains the correspondence relationship of the flow ID FI and the service type ID SI. If the RAN access node 120 has already maintained the correspondence relationship of the flow ID FI and the service type ID SI before receiving the user plane packet, then the RAN access node 120 modifies, maintains or deletes the correspondence relationship of the flow ID FI and the service type ID SI according to the instruction from the core network 110.

If the RAN access node 120 has not maintained the correspondence relationship RS of the flow ID FI and a service type ID SI and a service type ID SI is comprised in the user plane packet header HD3, the RAN access node 120 obtains the service type ID SI from the user plane packet header HD3 (steps S1202, S1204, S1205). If a service type ID SI should be comprised in the packet data unit PDU of the user plane packet (such as configured according to standard specifications or operator network systems), in an alternative embodiment of steps S1201 and S1204 the RAN access node 120 reads and identifies the service type ID SI from the packet data unit of the user plane packet.

If the RAN access node 120 has not maintained the correspondence relationship RS of the flow ID FI and a service type ID SI and the user plane packet header HD4 does not comprise a service type ID SI, the RAN access node 120 uses a default service type ID as the corresponding service type ID SI (steps S1202, S1204, and S1206). In another alternative embodiment of S1204 and S1205 that if the service type ID SI of the wireless network system 100 should be comprised in the packet data unit of the user plane packet, the RAN access node 120 reads the packet data unit of the user plane packet and identifies that whether or not a service type ID SI is comprised in the packet data unit PDU (step S1204).

In the embodiment indicated in FIG. 7, the step S1202 of determining whether the correspondence relationship RS has already been maintained is performed before the step S1204 of determining whether the service type ID SI is comprised in the user plane packet.

After step S1205 or S1206 is performed, the method proceeds to step S1207a. The RAN access node 120 maintains the correspondence relationship RS between the flow ID FI and a service type ID SI in the storage unit 123. The step S1207a of maintaining the correspondence relationship RS of the flow ID FI and a service type ID SI to the storage unit 123 can be performed before or after step S1207 according to the setting of the wireless network system 100. In step S1207, the processing unit 122 establishes a process instance and a transmission instance or arranges an existing process instance and an existing transmission instance according to the flow ID FI and the service type ID SI, and further assists the configuration of the user equipment 130 by accordance with the information of the control plane, wherein the process instance is for processing the user plane packet of the bearer associated with the QoS profile corresponding to the flow ID FI and the service type ID SI, and the transmission instance is for transmitting the user plane packet to the user equipment according to the flow ID FI and the service type ID SI.

The process instance includes a communication protocol instance associated to the QoS profile corresponding to the flow ID FI and the service type ID SI. The communication protocol instance, such as an instance of a Service Data Adaptation Protocol (SDAP) entity, a Packet Data Convergence Protocol (PDCP) entity, a Radio Link Control (RLC) entity, and a Medium Access Control (MAC) entity, is for encapsulating and decapsulating the packets between the communication protocols and for reading and setting the parameters or information elements. The transmission instance includes the transmission channel (such as logical channel (LCH), logical channel group (LCG), data radio bearer (DRB)) and the configuration (such as logical channel priority (LCP), modulation and coding scheme (MCS)) of each communication protocol of a bearer associated with the bearer QoS profile corresponding to the flow ID FI and the service type ID SI.

After step S1207 or S1203 is performed, the method proceeds to step S1208. In step S1208, the processing unit 122 transmits a user plane packet to a designated process instance, and further transmits a processed user plane packet to the user equipment 130 through a transmission instance.

Through the above embodiments, the RAN access node 120 can obtain the flow ID FI and the service type ID SI of a user plane packet and perform service level traffic differentiation to set up a data connection with the user equipment 130.

In another embodiment as indicated in step S1202, after determining whether the correspondence relationship RS of the flow ID FI and a service type ID SI has already been maintained, the RAN access node 120 further reads and identifies whether the user plane packet comprises a service type ID SI. If so, the service type ID SI of the user plane packet is corresponded with the flow ID FI, and the maintained correspondence relationship RS is modified, such that the maintained correspondence relationship RS enables the service type ID SI to be corresponded to the flow ID FI. Then, the method proceeds to step S1208, the processing unit 122 transmits the user plane packet to a designated process instance, and further transits the processed user plane packet to the user equipment 130 through a transmission instance.

Figure 8:
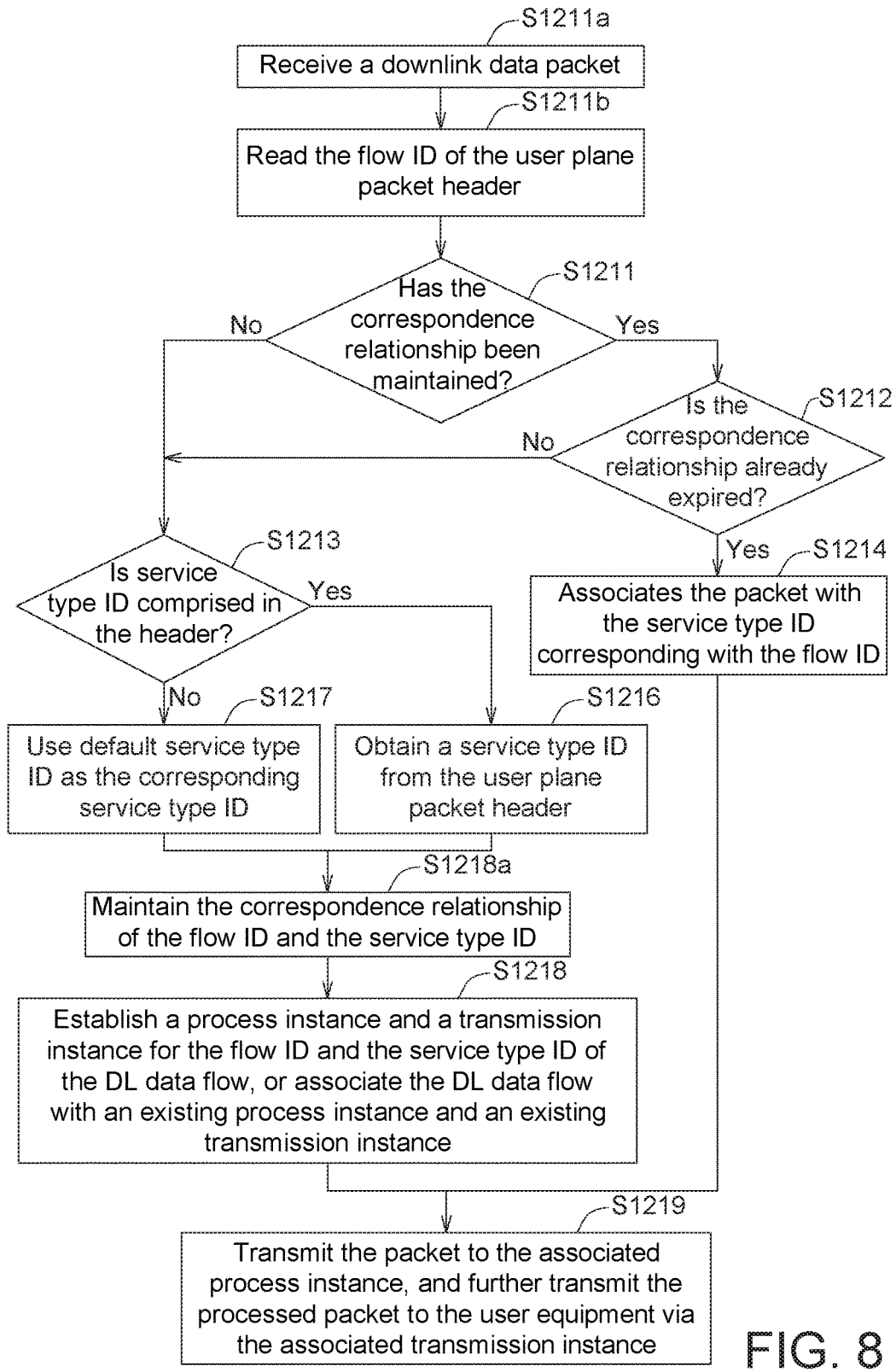
FIG. 8 is a detailed flowchart of step S120 of FIG. 4 according to another embodiment.

Referring to FIG. 8, a detailed flowchart of step S120 of FIG. 4 according to another embodiment is shown. The flowchart is described below with the user plane packet headers HD3 or HD4 of FIG. 2C. Firstly, the receiving unit 124 of the RAN access node 120 receives a user plane packet, such as a downlink data packet, from the core network 110 (step S1211a). The receiving unit 124 transmits the user plane packet to the processing unit 122 which further reads and identifies the flow ID FI of the user plane packet headers HD3 or HD4 (step S1211b).

If the RAN access node 120 has already maintained the correspondence relationship RS of the flow ID FI and a service type ID SI and the correspondence relationship RS is valid, the RAN access node 120 obtains the service type ID SI corresponding to the flow ID FI according to the correspondence relationship RS (steps S1211, S1212, and S1214).

If the RAN access node 120 has already maintained the correspondence relationship RS of the flow ID FI and a service type ID SI and the correspondence relationship RS is expired, the RAN access node 120 does not adopt the service type ID SI maintained in the correspondence relationship RS (steps S1211 and S1212).

If the RAN access node 120 has not maintained the valid correspondence relationship RS of the flow ID FI and the service type ID SI and the service type ID SI is comprised in the user plane packet header HD3, the RAN access node 120 obtains a service type ID SI from the user plane packet header HD3 (steps S1211, S1213 and S1216). If the service type ID SI should be contained in the packet data unit of the user plane packet (such as configured according to standard specifications or operator network systems), in an alternative embodiment of steps S1213 and S1216, the RAN access node 120 reads and identifies the service type ID SI from the packet data unit of the user plane packet (steps S1211 and step S1213).

If the RAN access node 120 has not maintained the valid correspondence relationship RS of the flow ID FI and the service type ID SI and the user plane packet header HD4 does not comprise a service type ID SI, the RAN access node 120 uses a default service type ID as the corresponding service type ID SI of the flow ID FI (steps S1211, S1213, and S1217). In another alternative embodiment of steps S1213 and S1216, if the service type ID SI should be contained in the packet data unit of the user plane packet, then the RAN access node 120 reads the packet data unit of the user plane packet and identifies that whether or not a service type ID SI is comprised in the packet data unit (steps S1213 and S1216).

In an embodiment indicated in FIG. 8, the step S1211 of determining whether the valid correspondence relationship RS of the flow ID FI and a service type ID SI has been maintained is performed before the step S1213 of determining whether the user plane packet is comprised in the service type ID SI.

After step S1216 or S1217 is performed, the method proceeds to step S1218a, the RAN access node 120 maintains the correspondence relationship RS of the flow ID FI and the service type ID SI in the storage unit 123. The step S1218a of maintaining the correspondence relationship RS of the flow ID FI and the service type ID SI in the storage unit 123 can be performed before or after step S1218 according to the setting of the wireless network system 100. In step S1218, the processing unit 122 establishes a corresponding process instance and a corresponding transmission instance according to the flow ID FI and the service type ID SI or arranges an existing process instance and an existing transmission instance according to the flow ID and the service type ID SI, and further assists the configuration of the user equipment 130 by accordance with the information of the control plane.

After step S1218 or S1214 is performed, the method proceeds to step S1219. In step S1219, the processing unit 122 transmits the user plane packet to a designated process instance, and further transmits the processed user plane packet to the user equipment 130 through a transmission instance.

Through the above embodiments, the RAN access node 120 can obtain the flow ID FI and the service type ID SI of a user plane packet and perform service level traffic differentiation to set up a data connection with the user equipment 130.

Figure 9:
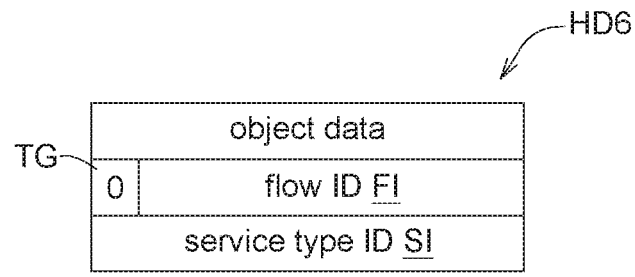
FIGS. 9 to 12 illustrate a user plane packet header according to another embodiment.
Figure 10:
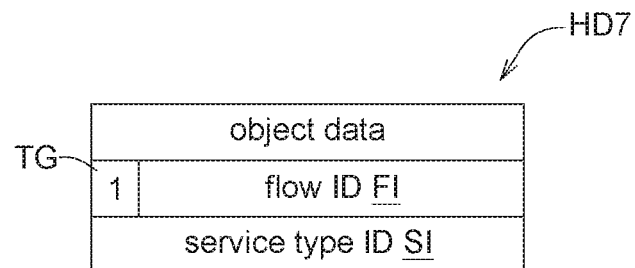
Figure 11:
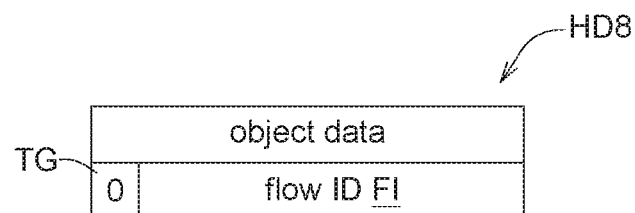
Figure 12:
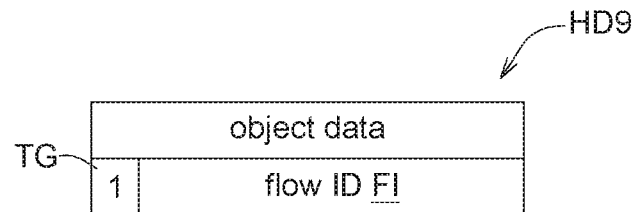

Refer to FIGS. 9 to 12, which illustrate user plane packet headers HD6, HD7, HD8, and HD9 according to another embodiment. In the embodiment as indicated in FIGS. 9 to 12, a modification indicator TG prior to the flow ID, which indicates whether the correspondence relationship RS needs to be modified. For example, setting the value of the modification indicator TG to "0" could imply that the correspondence relationship RS needs to be modified (FIG. 9 and FIG. 11); setting the value of the modification indicator TG to "1" could imply that the correspondence relationship RS does not need to be modified (FIG. 10 and FIG. 12).

Figure 13:
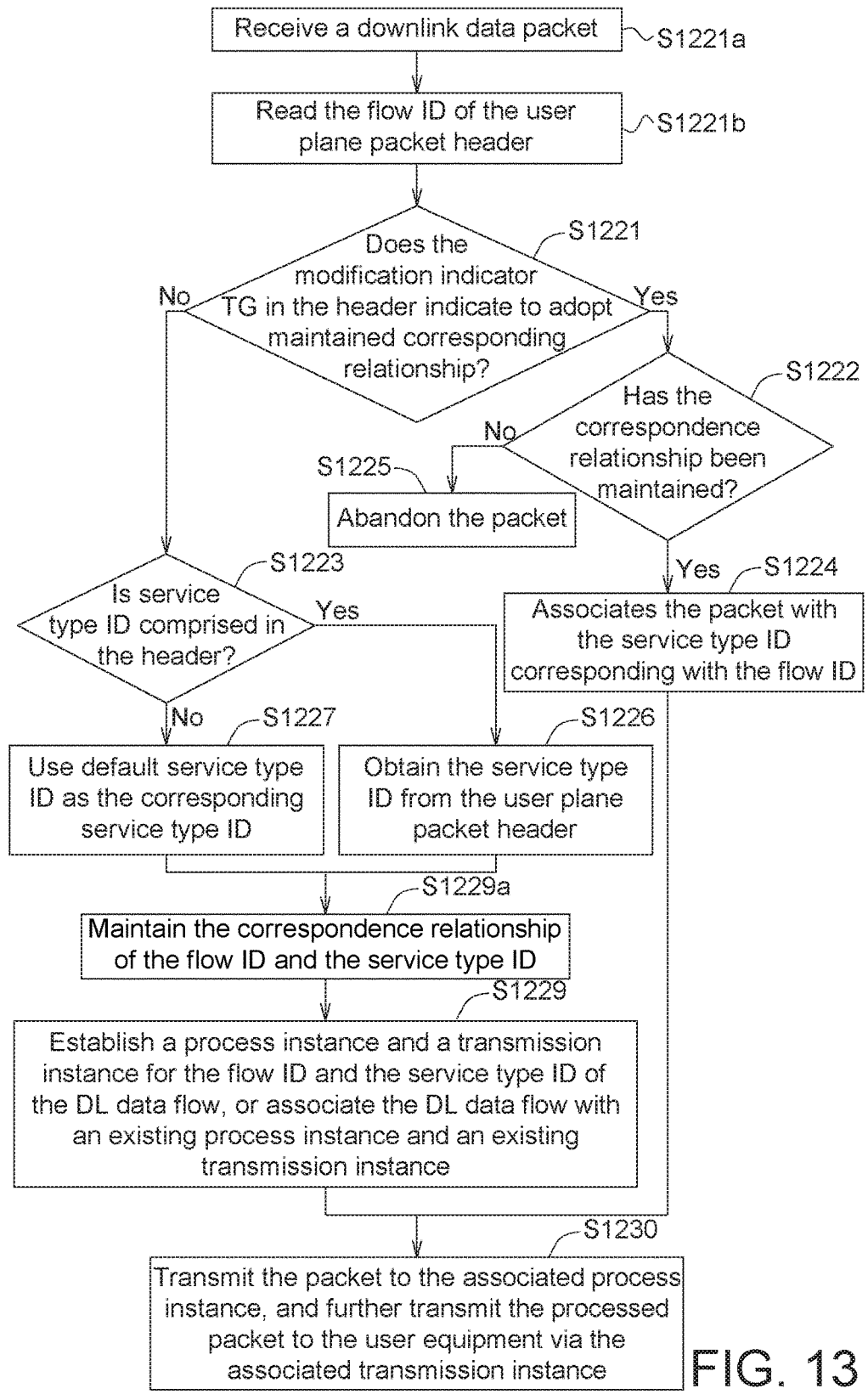
FIG. 13 is a detailed flowchart of step S120 of FIG. 4 according to another embodiment.

Referring to FIG. 13, a detailed flowchart of step S120 of FIG. 4 according to another embodiment is shown. The flowchart is described below with referring to the user plane packet headers HD6, HD7, HD8, and HD9 of FIGS. 9 to 12. Firstly, the receiving unit 124 of the RAN access node 120 receives a user plane packet, such as a downlink data packet, from the core network 110 (step S1221a). The receiving unit 124 transmits the user plane packet to the processing unit 122 which further reads and identifies the modification indicator TG of the user plane packet headers HD6, HD7, HD8, or HD9 and the flow ID FI (step S1221b).

As indicated in FIG. 10, 12, if the value of the modification indicator TG is 1, this could imply that the correspondence relationship RS does not need to be modified and the valid correspondence relationship RS has already been maintained in the storage unit 123 of the RAN access node 120, the RAN access node 120 obtains a service type ID SI corresponding to the flow ID FI according to the correspondence relationship RS (steps S1221, S1222, and S1224).

If the modification indicator TG indicates that the correspondence relationship RS does not need to be modified and the valid correspondence relationship RS has not been maintained in the storage unit 123 of the RAN access node 120, then the packet is abandoned (steps S1221, S1222 and S1225).

As indicated in FIG. 9, if the modification indicator TG indicates that the correspondence relationship RS needs to be modified and the service type ID SI is comprised in the user plane packet header HD6, then the RAN access node 120 obtains a service type ID SI from the user plane packet header HD6 (steps S1221, S1223 and S1226). If the service type ID SI should be contained in the packet data unit of the user plane packet (such as configured according to standard specifications or operator network systems), in an alternative embodiment of step S1213 and S1216 the RAN access node 120 reads and identifies the service type ID SI from the packet data unit of the user plane packet.

As indicated in FIG. 11, if the modification indicator TG indicates that the correspondence relationship RS needs to be modified and no service type ID SI is comprised in the user plane packet header HD8, then the RAN access node 120 uses a default service type ID as the service type ID SI corresponding to the flow ID FI (steps S1221, S1223, S1227).

In the embodiment as indicated in FIG. 13, the step S1221 of determining whether the correspondence relationship RS needs to be modified is performed before step S1222 of determining whether the valid correspondence relationship RS of the flow ID FI and the service type ID SI has been maintained in the RAN access node and the step S1223 of determining whether the service type ID SI exists in the user plane packet.

In steps S1223 and S1227, the processing unit 122 changes the correspondence relationship RS, such that the correspondence relationship RS enables the service type ID to be corresponded to the flow ID FI.

After step S1226 or S1227 is performed, the method proceeds to step S1229a, the RAN access node 120 maintains the correspondence relationship RS of the flow ID FI and the service type ID SI to the storage unit 123. Step S1229a can be performed before or after step S1229 according to the setting of the wireless network system 100. In step S1229, the processing unit 122 establishes a corresponding process instance and a corresponding transmission instance according to the flow ID FI and the service type ID SI or arranges an existing process instance and an existing transmission instance according to the configuration of the service type ID SI, and further assists the configuration of the user equipment 130 by accordance with the information of the control plane.

After step S1229 or S1224 is performed, the method proceeds to step S1230. In step S1230, the processing unit 122 transmits the user plane packet to a designated process instance, and further transmits the processed user plane packet to the user equipment 130 through a transmission instance.

Through the above embodiments, the RAN access node 120 can obtain the flow ID FI and the service type ID SI of a user plane packet and perform service level traffic differentiation to set up a data connection with the user equipment 130.

Figure 14:
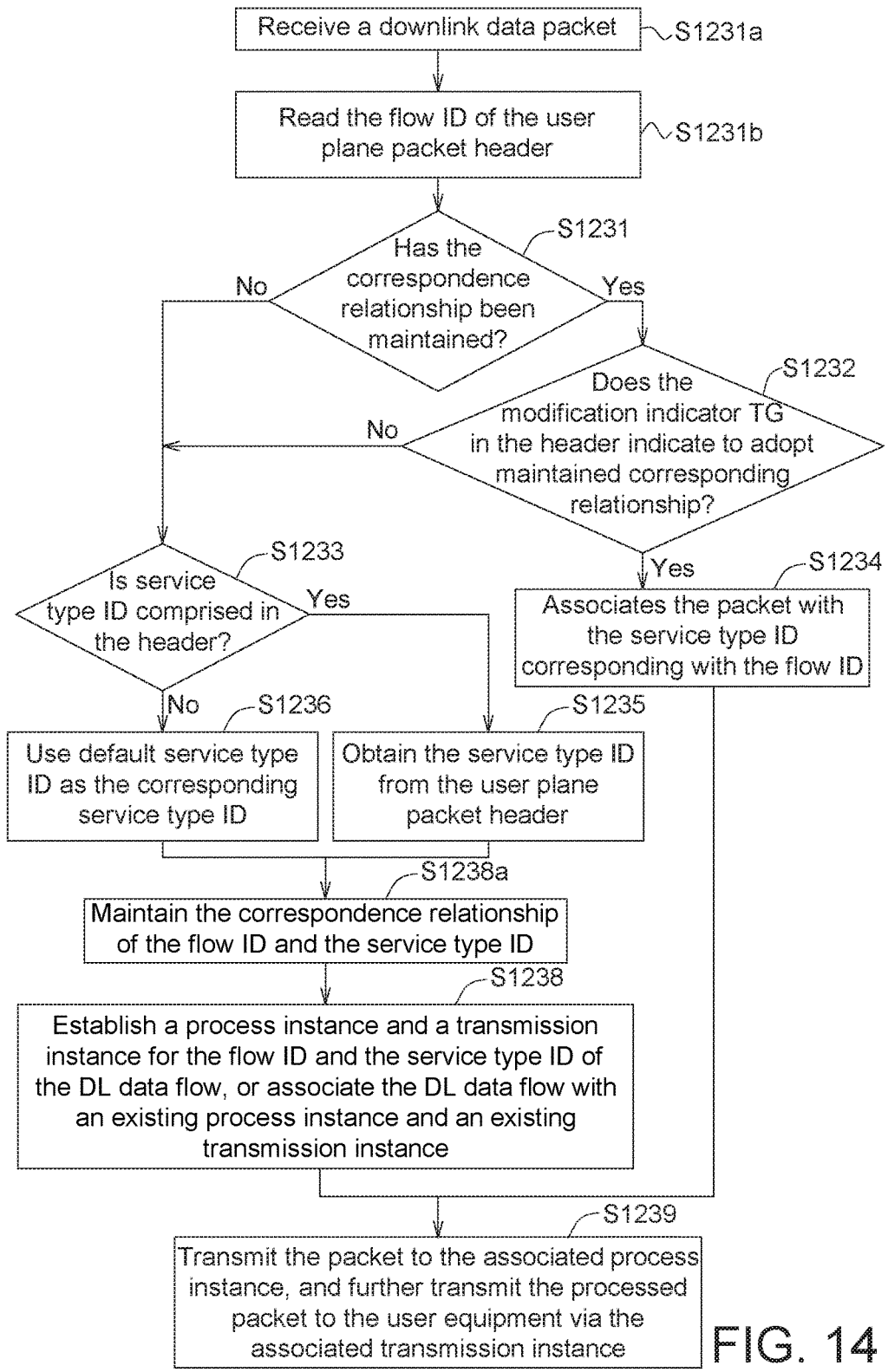
FIG. 14 is a detailed flowchart of step S120 of FIG. 4 according to another embodiment.

Referring to FIG. 14, a detailed flowchart of step S120 of FIG. 4 according to another embodiment is shown. The flowchart is described below with the user plane packet headers HD6, HD7, HD8, and HD9 of FIGS. 9 to 12. Firstly, the receiving unit 124 of the RAN access node 120 receives a user plane packet, such as a downlink data packet, from the core network (step S1231a). Then, the receiving unit 124 transmits the user plane packet to the processing unit 122 which further reads and identifies the modification indicator TG of the user plane packet headers HD6, HD7, HD8, and HD9 and the flow ID FI (step S1231b).

As indicated in FIG. 10, 12, if the valid correspondence relationship RS has already been maintained in the storage unit 123 of the RAN access node 120 and the modification indicator TG indicates that the correspondence relationship RS does not need to be modified, then the RAN access node 120 obtains the service type ID SI corresponding to the flow ID FI according to the correspondence relationship RS (steps S1231, S1232, and S1234).

As indicated in FIG. 9, if the valid correspondence relationship RS has not been maintained in the storage unit 123 of the RAN access node 120 and the service type ID SI is comprised in the user plane packet header HD6, then the RAN access node 120 obtains a service type ID SI from the user plane packet header HD6 (steps S1231, S1233, and S1235).

As indicated in FIG. 11, if the valid correspondence relationship RS has not been maintained in the storage unit 123 of the RAN access node 120 and the service type ID SI is not comprised in the user plane packet header HD8, then the RAN access node 120 uses a default service type ID as the corresponding service type ID SI of the flow ID FI (steps S1231, S1233 and S1236).

In an embodiment indicated in FIG. 14, the step S1231 of determining whether the valid correspondence relationship RS is maintained is performed before the step S1232 of determining whether the correspondence relationship RS needs to be modified and the step S1233 of determining whether the service type ID SI is comprised in the user plane packet.

In step S1232, if it is determined that the correspondence relationship RS needs to be modified, the method proceeds to step S1233, whether the service type ID SI is comprised in the user plane packet is determined. If the service type ID SI is comprised in the user plane packet, the RAN access node 120 obtains a service type ID SI from the user plane packet (steps S1232, S1233, and S1235). If service type ID SI is not comprised in the user plane packet, the RAN access node 120 uses a default service type ID as the corresponding service type ID SI of the flow ID FI (steps S1232, S1233, and S1236). In steps S1233 and S1236, the processing unit 122 modifies the maintained correspondence relationship RS, such that the flow ID FI can correspond to the service type ID SI.

After step S1235 or S1236 is performed, the method proceeds to step S1238a, the RAN access node 120 maintains the correspondence relationship RS between the flow ID FI and the service type ID SI in the storage unit 123. The step S1238a of maintaining the correspondence relationship RS between the flow ID FI and the service type ID SI in the storage unit 123 can be performed before or after step S1238 according to the setting of the wireless network system 100. In step S1238, the processing unit 122 establishes a corresponding process instance and a corresponding transmission instance according to the flow ID FI and the service type ID SI, or arranges an existing process instance and an existing transmission instance according to the configuration of the service type ID SI, and further assists the configuration of the user equipment 130 by accordance with the information of the control plane.

After step S1238 or S1234 is performed, the method proceeds to step S1239. In step S1239, the processing unit 122 transmits the user plane packet to a designated process instance, and further transmits the processed user plane packet to the user equipment 130 through a transmission instance.

Through the above embodiments, the RAN access node 120 can obtain the flow ID FI and the service type ID SI and perform service level traffic differentiation to set up a data connection with the user equipment 130.

In another embodiment, whether the correspondence relationship RS needs to be modified can be directly determined according to whether the service type ID SI is comprised in the user plane packet. If the service type ID SI is comprised in the user plane packet, the correspondence relationship RS needs to be modified; otherwise, the correspondence relationship RS does not need to be modified.

Figure 15:
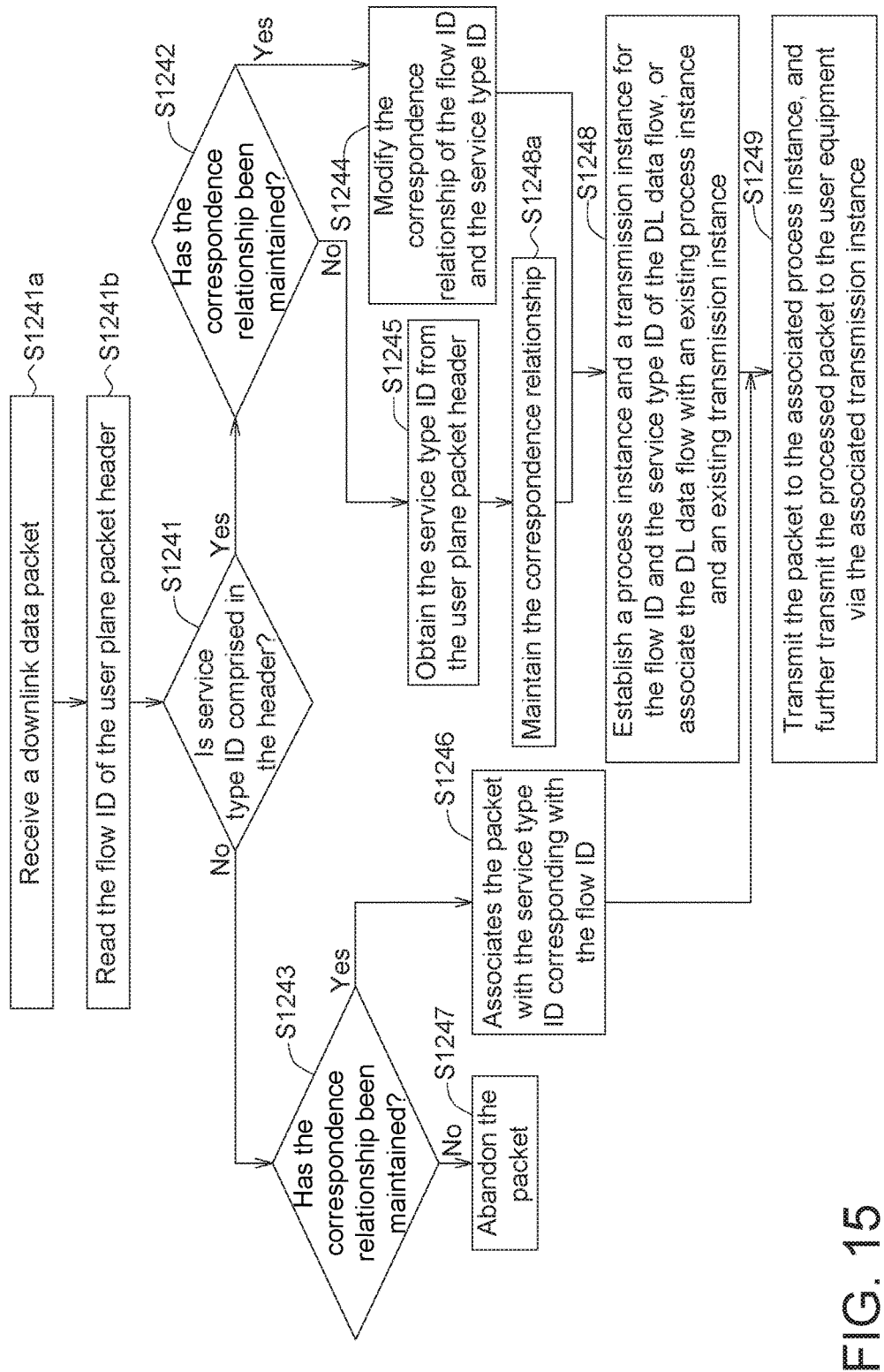
FIG. 15 is a detailed flowchart of step S120 of FIG. 4 according to another embodiment.

Referring to FIG. 15, a detailed flowchart of step S120 of FIG. 4 according to another embodiment is shown. The flowchart is described below with the user plane packet headers HD3 and HD4 of FIG. 2C. Firstly, the receiving unit 124 of the RAN access node 120 receives a user plane packet, such as a downlink data packet, from the core network (step S1241a). The receiving unit 124 transmits the user plane packet to the processing unit 122, which further reads and identifies the flow ID FI of the user plane packet headers HD3 or HD4 (step S1241b).

If the service type ID SI is comprised in the user plane packet header HD3, and the valid correspondence relationship RS of the flow ID FI and the service type ID SI has already been maintained in the RAN access node 120, the RAN access node 120 corresponds the service type ID SI of the user plane packet to the flow ID FI, and modifies the maintained correspondence relationship RS, such that the maintained correspondence relationship RS enables the service type ID SI to be corresponded to the flow ID FI (steps S1241, S1242, and S1244). If the service type ID SI should be contained in the packet data unit of the user plane packet (such as configured according to standard specifications or operator network systems), then the RAN access node 120 reads and identifies the service type ID SI from the packet data unit of the user plane packet (steps S1241b and step S1243).

If the service type ID SI is comprised in the user plane packet header HD3, and the valid correspondence relationship RS of the flow ID FI and a service type ID SI has not been maintained in the RAN access node 120, then the RAN access node 120 obtains a service type ID SI from the user plane packet (steps S1241, S1242, and S1245).

If no service type ID SI is comprised in the user plane packet header HD4 and the valid correspondence relationship RS of the flow ID FI and a service type ID SI has already been maintained in the RAN access node 120, the RAN access node 120 obtains the service type ID SI corresponding to the flow ID FI according to the correspondence relationship RS (steps S1241, S1243, and S1246).

If no service type ID SI is comprised in the user plane packet header HD4 and the valid correspondence relationship RS of the flow ID FI and the service type ID SI has not been maintained in the RAN access node 120, then the packet is abandoned (steps S1241, S1243, S1247).

After step S1244 or S1245 is performed, the method proceeds to step S1248a, the RAN access node 120 maintains the correspondence relationship RS of the flow ID FI and a service type ID SI in the storage unit 123. The step S1248a of maintaining the correspondence relationship RS of the flow ID FI and the service type ID SI in the storage unit 123 can be performed before or after step S1248 according to the setting of the wireless network system 100. In step S1248, the processing unit 122 establishes a corresponding process instance and a corresponding transmission instance according to the flow ID FI and the service type ID SI or arranges an existing process instance and an existing transmission instance according to the flow ID FI and the service type ID SI, and further assists the configuration of the user equipment 130 by accordance with the information of the control plane.

After step S1248 or S1246 is performed, the method proceeds to step S1249. In step S1249, the processing unit 122 transmits the user plane packet to a designated process instance, and further transmits the processed user plane packet to the user equipment 130 through a transmission instance.

Through the above embodiments, the RAN access node 120 can obtain the flow ID FI and a service type ID SI and perform service level traffic differentiation to set up a data connection with the user equipment 130.

Figure 16:
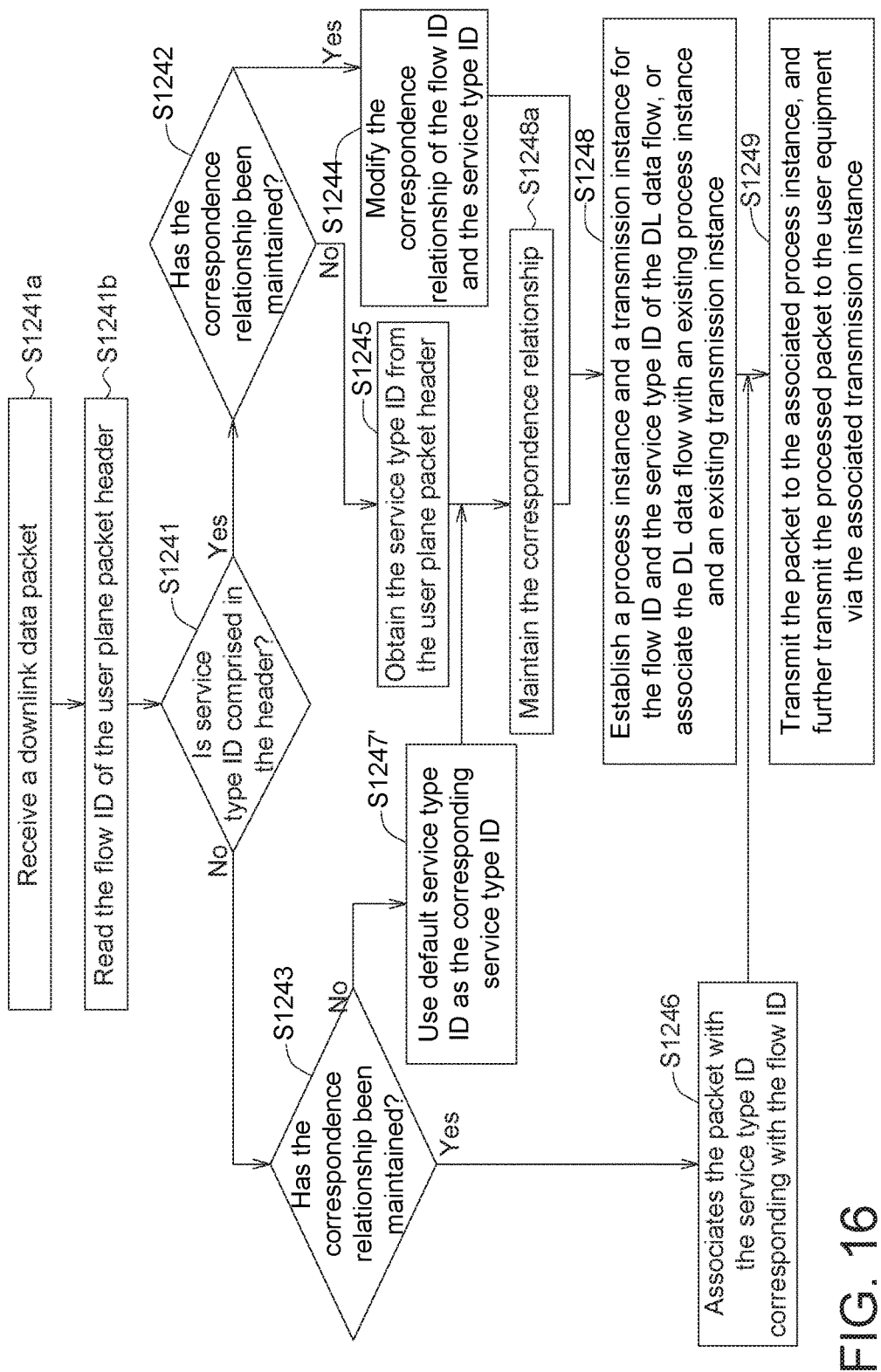
FIG. 16 is a detailed flowchart of step S120 of FIG. 4 according to another embodiment.

Referring to FIG. 16, a detailed flowchart of step S120 of FIG. 4 according to another embodiment is shown. FIG. 16 is different from FIG. 15 in step S1247'. In FIG. 16, if no service type ID SI is comprised in the user plane packet header HD4 and the valid correspondence relationship RS of the flow ID FI and a service type ID SI has not been maintained in the RAN access node 120, then the RAN access node 120 uses a default service type ID as the corresponding service type ID SI of the flow ID FI (step S1247').

Through the above embodiments, the RAN access node 120 can obtain the flow ID FI and a service type ID SI and perform service level traffic differentiation to set up a data connection with the user equipment 130.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of service level traffic differentiation at a radio access network of a wireless network system, comprising:

transmitting a data flow information comprising a flow ID to a radio access network access node (RAN access node) by a core network of the wireless network system via a user plane packet of an interface between the core network and the RAN access node; and setting up a data connection with a user equipment by the RAN access node according to the data flow information;

wherein the data flow information further comprises a service type ID; and there is a correspondence relationship between the flow ID and the service type ID, and a modification indicator prior to the flow ID indicating whether the correspondence relationship needs to be modified.

2. The method of service level traffic differentiation at the radio access network according to claim 1, wherein the data flow information comprises a configuration of quality of services (configuration of QOS), and the service type ID comprises a service data flow feature (SDF feature).

3. The method of service level traffic differentiation at the radio access network according to claim 2, wherein the SDF feature comprises a throughput emphasis, a reliability emphasis, a delay sensitivity, or a network slice instance ID.

4. The method of service level traffic differentiation at the radio access network according to claim 1, wherein the flow ID and the service type ID are recorded in a user plane packet header of the user plane packet, and the user plane packet header is byte alignment.

5. The method of service level traffic differentiation at the radio access network according to claim 4, wherein the flow ID and the service type ID are discontinuously located in the user plane packet header.

6. The method of service level traffic differentiation at the radio access network according to claim 4, wherein the flow ID and the service type ID are continuously located in the user plane packet header.

7. The method of service level traffic differentiation at the radio access network according to claim 1, wherein a length of the flow ID is fixed and a length of the service type ID is fixed.

8. The method of service level traffic differentiation at the radio access network according to claim 1, wherein a length of the service type ID is variable, and sum of a length of the flow ID and the length of the service type ID is fixed.

9. The method of service level traffic differentiation at the radio access network according to claim 1, wherein a length of the service type ID is variable, and a starting position of the service type ID is indicated by a service type ID indicator with a fixed length.

10. The method of service level traffic differentiation at the radio access network according to claim 1, wherein the flow ID is recorded in the user plane packet header of the user plane packet, and the service type ID is recorded in a packet data unit of the user plane packet.

11. The method of service level traffic differentiation at the radio access network according to claim 10, wherein the service type ID is recorded in a last end of the packet data unit of the user plane packet, and a last bit of the service type ID is a last bit of the packet data unit.

12. The method of service level traffic differentiation at the radio access network according to claim 10, wherein a length of the service type ID is fixed.

13. The method of service level traffic differentiation at the radio access network according to claim 10, wherein a length of the service type ID is variable, and a starting position of the service type ID is indicated by a service type ID indicator with a fixed length.

14. The method of service level traffic differentiation at the radio access network according to claim 13, wherein the service type ID indicator is recorded in a last end of the packet data unit of the user plane packet, a last bit of the service type ID indicator is a last bit of the packet data unit, the service type ID indicator is not encrypted by an encryption key used for a user plane encryption protection between the user equipment and the core network, and a prior bit of the service type ID indicator is a last bit of the service type ID.

15. The method of service level traffic differentiation at the radio access network according to claim 10, wherein the service type ID is not encrypted by an encryption key used for a user plane encryption protection between the user equipment and the core network.

16. A wireless network system, comprising:
a core network for transmitting a data flow information comprising a flow ID via a user plane packet of an interface between the core network and a RAN access node;
the RAN access node for receiving the data flow information transmitted from the core network; and
a user equipment to which a data connection is set up by the RAN access node according to the data flow information;
wherein the data flow information further comprises a service type ID;
the flow ID is recorded in a user plane packet header of a user plane packet, and the service type ID is recorded in a packet data unit of the user plane packet; and
the service type ID is recorded in a last end of the packet data unit of the user plane packet, and a last bit of the service type ID is a last bit of the packet data unit.

17. The wireless network system according to claim 16, wherein the data flow information comprises a configuration of quality of services (configuration of QOS), and the service type ID comprises a service data flow feature (SDF feature).

18. The wireless network system according to claim 17, wherein the SDF feature comprises a throughput emphasis, a reliability emphasis, a delay sensitivity, or a network slice instance ID.

19. The wireless network system according to claim 16, wherein a length of the flow ID is fixed and a length of the service type ID is fixed.

20. The wireless network system according to claim 16, wherein a length of the service type ID is variable, and sum of a length of the flow ID and the length of the service type ID is fixed.

21. The wireless network system according to claim 16, wherein a length of the service type ID is variable, and a starting position of the service type ID is indicated by a service type ID indicator with a fixed length.

22. The wireless network system according to claim 16, wherein a length of the service type ID is fixed.

23. The wireless network system according to claim 16, wherein a length of the service type ID is variable, and a starting position of the service type ID is indicated by a service type ID indicator with a fixed length.

24. The wireless network system according to claim 23, wherein the service type ID indicator is recorded in a last end of the packet data unit of the user plane packet, a last bit of the service type ID indicator is a last bit of the packet data unit, the service type ID indicator is not encrypted by an encryption key used for a user plane encryption protection between the user equipment and the core network, and a prior bit of the service type ID indicator is a last bit of the service type ID.

25. The wireless network system according to claim 16, wherein the service type ID is not encrypted by an encryption key used for a user plane encryption protection between the user equipment and the core network.

26. The wireless network system according to claim 16, wherein there is a correspondence relationship between the flow ID and the service type ID, and a modification indicator prior to the flow ID indicating whether the correspondence relationship needs to be modified.

27. A radio access network access node (RAN access node), comprising:
a receiving unit for receiving a data flow information comprising a flow ID from a core network of a wireless network system via a user plane packet of an interface between the core network and the RAN access node;

a processing unit for determining a bearer corresponding with the user plane packet according to the data flow information and the user equipment associated the data flow information; and a transmission unit for setting up a data connection with the user equipment according to the bearer;

wherein the data flow information further comprises a service type ID;

the flow ID is recorded in a user plane packet header of the user plane packet, and the service type ID is recorded in a packet data unit of the user plane packet; and the service type ID is recorded in a last end of the packet data unit of the user plane packet, and a last bit of the service type ID is a last bit of the packet data unit.

28. The RAN access node according to claim 27, wherein the data flow information comprises a configuration of quality of services (configuration of QOS), and the service type ID comprises a service data flow feature (SDF feature).

29. The RAN access node according to claim 28, wherein the SDF feature comprises a throughput emphasis, a reliability emphasis, a delay sensitivity, or a network slice instance ID.

30. The RAN access node according to claim 27, wherein the flow ID and the service type ID are recorded in the user plane packet header of the user plane packet, and the user plane packet header is byte alignment.

31. The RAN access node according to claim 30, wherein the flow ID and the service type ID are discontinuously located in the user plane packet header.

32. The RAN access node according to claim 30, wherein the flow ID and the service type ID are continuously located in the user plane packet header.

33. The RAN access node according to claim 27, wherein a length of the flow ID is fixed and a length of the service type ID is fixed.

34. The RAN access node according to claim 27, wherein a length of the service type ID is variable, sum of a length of the flow ID and the length of the service type ID is fixed.

35. The RAN access node according to claim 27, wherein a length of the service type ID is variable, and a starting position of the service type ID is indicated by a service type ID indicator.

36. The RAN access node according to claim 27, wherein a length of the service type ID is fixed.

37. The RAN access node according to claim 27, wherein a length of the service type ID is variable, and a length of the service type ID is indicated by a service type ID indicator with a fixed length.

38. The RAN access node according to claim 37, wherein the service type ID indicator is recorded in a last end of the packet data unit of the user plane packet, a last bit of the service type ID indicator is a last bit of the packet data unit, the service type ID indicator is not encrypted by an encryption key used for a user plane encryption protection between the user equipment and the core network, and a prior bit of the service type ID indicator is a last bit of the service type ID.

39. The RAN access node according to claim 27, wherein the service type ID is not encrypted by an encryption key used for a user plane encryption protection between the user equipment and the core network.

40. The RAN access node according to claim 27, wherein there is a correspondence relationship between the flow ID and the service type ID, and a modification indicator prior to the flow ID indicating whether the correspondence relationship needs to be modified.

* * * * *